United States Patent
Ligon et al.

(10) Patent No.: US 7,761,316 B2
(45) Date of Patent: Jul. 20, 2010

(54) SYSTEM AND METHOD FOR DETERMINING PERFORMANCE LEVEL CAPABILITIES IN VIEW OF PREDETERMINED MODEL CRITERIA

(75) Inventors: Steven R. Ligon, Sterling, VA (US); William R. Gaither, Woodbridge, VA (US); Douglas S. Barron, Fairfax Station, VA (US)

(73) Assignee: Science Applications International Corporation, San Diego, CA (US)

( * ) Notice: Subject to any disclaimer, the term of this patent is extended or adjusted under 35 U.S.C. 154(b) by 1484 days.

(21) Appl. No.: 10/690,657

(22) Filed: Oct. 23, 2003

(65) Prior Publication Data

US 2004/0098299 A1    May 20, 2004

Related U.S. Application Data

(60) Provisional application No. 60/421,065, filed on Oct. 25, 2002.

(51) Int. Cl.
G06F 9/44    (2006.01)
(52) U.S. Cl. .......................................... 705/7; 705/11
(58) Field of Classification Search ...................... 705/9
See application file for complete search history.

(56) References Cited

U.S. PATENT DOCUMENTS

| | | | | |
|---|---|---|---|---|
| 5,765,138 | A * | 6/1998 | Aycock et al. | 705/7 |
| 6,256,773 | B1 * | 7/2001 | Bowman-Amuah | 717/121 |
| 6,324,522 | B2 | 11/2001 | Peterson et al. | 705/28 |
| 6,434,628 | B1 | 8/2002 | Bowman-Amuah | 709/303 |
| 6,567,824 | B2 | 5/2003 | Fox | 707/104.1 |
| 6,609,108 | B1 | 8/2003 | Pulliam et al. | 705/27 |
| 6,609,128 | B1 * | 8/2003 | Underwood | 707/10 |
| 6,721,713 | B1 | 4/2004 | Guheen et al. | 705/1 |
| 6,732,167 | B1 | 5/2004 | Swartz et al. | 709/223 |
| 7,136,792 | B2 * | 11/2006 | Balz et al. | 703/6 |
| 7,315,826 | B1 * | 1/2008 | Guheen et al. | 705/7 |
| 7,406,430 | B2 * | 7/2008 | Atefi et al. | 705/7 |
| 2002/0184073 | A1 | 12/2002 | Beshore | 705/10 |
| 2003/0004754 | A1 | 1/2003 | Krutz | 705/2 |

(Continued)

FOREIGN PATENT DOCUMENTS

WO    WO 01/25970 A1 *    10/1999

(Continued)

OTHER PUBLICATIONS

Krishnan et al., "An Empirical Analysis of Productivity and Quality in Software Products", Management Science, vol. 46, No. 6, Jun. 2000, pp. 745-759.*

(Continued)

Primary Examiner—Jonathan G. Sterrett
Assistant Examiner—Thomas Mansfield
(74) Attorney, Agent, or Firm—King & Spalding LLP

(57) ABSTRACT

Described is a process and system for tracing a company's work products to the equivalent work product element requirements for individual maturity models in order to ascertain an approximate determination of the maturity level of a particular maturity model that has been achieved by the company. The maturity models included, for example, CMM-based models, or maturity model equivalents such as, contractor operational processes and ISO (International Standards Organization) requirements.

17 Claims, 21 Drawing Sheets

U.S. PATENT DOCUMENTS

| | | | |
|---|---|---|---|
| 2003/0033191 A1* | 2/2003 | Davies et al. | 705/10 |
| 2003/0070157 A1* | 4/2003 | Adams et al. | 717/101 |
| 2003/0110067 A1* | 6/2003 | Miller et al. | 705/8 |
| 2003/0188290 A1 | 10/2003 | Corral | 717/101 |
| 2004/0010709 A1* | 1/2004 | Baudoin et al. | 713/201 |

FOREIGN PATENT DOCUMENTS

| | | |
|---|---|---|
| WO | WO 01/25970 | 4/2001 |
| WO | WO 02/103490 | 12/2002 |

OTHER PUBLICATIONS

Paulk et al., "Capability Maturity Model for Software, Version 1.1", Software Engineering Institute, Carnegie Mellon University, 1993.*

International Preliminary Examination Report for Application No. PCT/US03/33576, dated Sep. 20, 2004 (mailing date).

Corrected International Search Report for Application No. PCT/US03/33576, dated Jul. 2, 2004 (mailing date).

International Search Report for Application No. PCT/US03/33576, dated Jun. 22, 2004 (mailing date).

"Process Maturity Profile—CMMI v. 1.1," *Carnegie Mellon University, Software Engineering Institute*, Sep. 2003, pp. 1-22.

"Boeing and Cimarron Share Top NASA Small Business Development Award," *Business Wire*, Sep. 20, 2002, 1 p.

"NetSol—PVT—Ltd. First Technology Company in Pakistan Awarded SEI CMM Level 2 Assessment," *Business Wire*, Mar. 15, 2002, 3 pp.

"NIIT Becomes World's First Content Developer to be Assessed at SEI-CMM Level 5," *Business Wire*, Jul. 12, 2001, 3 pp.

Tecuci, Gheorghe, et al., "An Innovative Application from the DARPA Knowledge Bases Programs," *AI Magazine*, vol. 22, No. 2, Jun. 22, 2001, p. 43 (23 pp.).

Kazman, Rick, et al., "Economic Modeling of Software Architectures," *The Architect*, vol. 4, No. 3, Third Quarter 2001, 4 pp.

MacMillan, Michael, "ISO Not Enough, Says Software Expert: Industry Veteran Says Development Standard Invented by U.S. Military Better at Addressing Buggy Software—Industry Trend or Event," *Computing Canada*, Dec. 1, 2000, 2 pp.

"CSC Business Unit Earns Coveted SEI Level 5 Maturity Rating," *PR Newswire*, Dec. 2, 1998, 2 pp.

Ralphs, Stephen, "Skepticism Over the Value of ISO Certification Rising—Industry Trend or Event," *Computing Canada*, May 25, 1998, 2 pp.

Gainer, Jeff, "Process Improvement: The Capability Maturity Model" [online], May 10, 1998 [retrieved on May 17, 2004], 3 pp., Retrieved from the Internet: http://www.itmweb.com/f051098.htm.

"SAIC Plays Key Role in Systems Engineering Revitalization Initiative," *Spectrum Aerospace, Intelligence & Information Sector Newsletter*, 3 pp., May/Jun. 2003.

Paulk, Mark C., et al., "Capability Maturity Model$^{SM}$ for Software, Version 1.1," Technical Report, Software Engineering Institute, Carnegie Mellon University, 81 pp., Feb. 1993.

* cited by examiner

CMMI Add/Edit Data

SAIC Capability Model Tracer
Add/Edit CMMI Data

Select Process Area Category: E - Engineering

Select the Process Area you wish to work with: PI - Product Integration

Generic Goals and Practices

CMMI Specific Goals:

| Goal Type | Goal Nbr | Goal Title |
|---|---|---|
| SG | 1 | Prepare for Product Integration |
| SG | 2 | Ensure Interface Compatibility |
| SG | 3 | Assemble Products Components and Deliver the Product |
| SG | 0 | |

CMMI Specific Practices:

| Cap Lvl | | Prct Nbr | Practice Title |
|---|---|---|---|
| 1 | SP | 1 | Determine Integration Sequence |
| 1 | SP | 2 | Establish the Product Integration Environment |
| 1 | SP | 3 | Establish Product Integration Procedures and Criteria |
| 1 | SP | 0 | |

Add/Edit SubPractices | Add/Edit Process Area | Add/Edit Process Area Categories

Figure 6

SAIC Capability Model Tracer
Add/Edit CMMI Data

Select Process Area Category: E - Engineering

Generic Goals Practices frm_CMMI_SubPractices : Form

SAIC Capability Model Tracer
Add/Edit CMMI Specific SubPractices

SG 1 - Prepare for Product Integration

SP 1 - Determine Integration Sequence

| | | |
|---|---|---|
| 1.1-1 | 1 | Identify the product components to be integrated |
| 1.1-1 | 2 | Identify the product integration verifications to be performed using the definition of the interfaces between the product components |
| 1.1-1 | 3 | Identify alternative product-component integration sequences |
| 1.1-1 | 4 | Select the best integration sequence |
| 1.1-1 | 5 | Periodically review the product integration sequence and revise as needed |
| 1.1-1 | 6 | Record the rationale for decisions made and deferred |

Figure 7

SAIC Capability Model Tracer
Add/Edit CMMI Data

Select Process Area Category: E - Engineering frm_CMMIProcessAreas : Form

Add/Edit CMMI Process Areas

| | |
|---|---|
| CAR | Casual Analysis and Resolution |
| CM | Configuration Management |
| DAR | Decision Analysis and Resolution |
| IPMIPPD | Integrated Project Management for IPPD |
| ISM | Integrated Supplier Management |
| IT | Integrated Teaming |
| MA | Measurement and Analysis |
| OEI | Organizational Environment for Integration |
| OID | Organizational Innovation and Deployment |
| OPD | Organizational Process Definition |
| OPF | Organizational Process Focus |
| OPP | Organizational Process Performance |
| OT | Organizational Training |
| PI | Product Integration |

Generic Goals and Practices

SubPractices | Area | Area Categories

Add/Edit SE-CMM Domain Practices iCMM® Domain Practices
Add/Edit Data

Select Process Type: [LEP - Lifecycle or Engineering Procedure ▼]    Generic Practices

Process Area

| PA | 01 | Needs | ▶X | ▲ |
| PA | 02 | Requirements | ▶X | |
| PA | 03 | Architectures | ▶X | |
| PA | 04 | Alternatives | ▶X | |
| PA | 05 | Outsourcing | ▶X | |
| PA | 06 | Software Development and Maintenance | ▶X | ▼ |

Base Practices

| BP 01. | 01 | Elicit Needs | ▶X | ▲ |
| BP 01. | 02 | Analyze Needs | ▶X | |
| BP 01. | 03 | Develop System Requirements | ▶X | |
| BP 01. | 04 | Obtain Customer Agreement | ▶X | |
| BP 01. | 05 | Inform Customer | ▶X | ▼ |

Figure 10

SE-CMM Add/Edit Data iCMM
Generic Practices
Add/Edit Data

Select Capability Level: [2 - Repeatable: Planned and Track ▼]

iCMM Generic Practices

1. Establish policy
2. Allocate adequate resources
3. Assign responsibilities
4. Ensure training
5. Document the process

Figure 11

Add/Edit SE-CMM Domain Practices

SE-CMM® Domain Practices
Add/Edit Data

Process Area

| PA | 01 | Analyze Candidate Solutions |
| PA | 02 | Derive and Allocate Requirements |
| PA | 03 | Evolve System Architecture |
| PA | 04 | Integrate Disciplines |
| PA | 05 | Integrate System |

Generic Practices

Base Practices

| BP 01. | 01 | Establish Evaluation Criteria based on the ide |
| BP 01. | 02 | Define the general approach for the analysis, |
| BP 01. | 03 | Identify Alternatives for Evaluation in additior |
| BP 01. | 04 | Analyze the Competeing Candidate Solutions |
| BP 01. | 05 | Select the Solution that Satisfies the Establis |
| BP 01. | 06 | Capture the Disposition of Each Alternative U |

Figure 14

SE-CMM® Domain Practices
Add/Edit Data

Add/Edit Work Products

Add/Edit Work Products

SEBP 01.01 Establish Evaluation Criteria based on the identified problem and its defined constraints Enter Work Product Name:

Captured Evaluation Criteria
Defect Data-related Criteria
Trade-Study Criteria

Delete Associations

Figure 16

Tracer Display

SAIC Capability Model Tracer
Query The Data

Select The Organizational Product You Wish to Trace    Print Query Results

Concept of Operations

| Work Products | Organizational Activities | SE-CMM Base Practices |
|---|---|---|
| Analyses, Trade Studies to be Performed | ERA 01-Develop Detailed Operations Concept | BP 02.01 Develop a detailed operational conc |
| Architecture/Design Constraints | ERA 02-Identify Key Requirements Issues | BP 02.08 Maintain requirements traceability t |
| Concept Briefs | ERA 09-Capture Results and Rationale | BP 02.09 Capture system and other requirem |
| Conceptual Architecture/Design Alternatives | ESD 02-Derive Architecture and Design Const | BP 03.04 Develop the interface requirements |
| Environmental Interface Requirements | ESD 03-Formulate Conceptual Architecture/De | BP 06.02 Analyze the customer's needs and |
| List Key Requirements | OPI 04-Identify and Plan Process Improvemen | BP 06.03 Develop a statement of system req |
| Operational Concept | | |
| Requirements Databases | | |
| Requirements Documents | | |
| System Concept | | |
| System Requirements | | |

| CMMI Practices | iCMM Base Practices |
|---|---|
| RD SP 1.1-1 Develop operational concepts a | BP 01.02 Analyze Needs |
| RD SP 1.2-1 Define the environment the pro | BP 01.03 Develop System Requirements |
| RD SP 1.3-1 Review operational concepts ar | BP 02.01 Develop detailed operational concep |
| RD SP 1.4-1 Develop a detailed operational | BP 02.07 Capture and baseline requirements |
| | BP 03.04 Develop architectural interface requ |

ERA 02-Identify Key Requirements Issues

SYSTEM AND METHOD FOR DETERMINING PERFORMANCE LEVEL CAPABILITIES IN VIEW OF PREDETERMINED MODEL CRITERIA

CROSS-REFERENCE TO RELATED APPLICATIONS

This application claims priority to U.S. Provisional Patent Application No. 60/421,065 filed Oct. 25, 2002, which is incorporated herein by reference in its entirety.

BACKGROUND OF THE INVENTION

1. Field of the Invention

The invention is drawn generally to the certification of business practices through maturity models and more particularly to the tracing of a company's practices to the those of at least one designated maturity model.

2. Description of the Related Art

Currently, many contracting parties require potential contractors to be certified at predefined levels of one or more maturity models. The basis for many maturity models is Carnegie Mellon's Software Engineering Institute's (SEI) Capability Maturity Model (CMM) Version 1.1 for software released in 1993, which is incorporated herein by reference in its entirety. Variations on the original CMM as well as other specialized maturity models have since been developed to aid contracting parties and contractors alike in determining and certifying the engineering maturity of a specific contractor. For example, based on the original CMM, Capability Maturity Model Integration (CMMI), P-CMM People Capability Maturity Model, SA-CMM Software Acquisition Capability Maturity Model, SE-CMM Systems Engineering Capability Maturity Model, and IPD-CMM Integrated Product Development Capability Maturity Model have since been developed. Similarly, many other maturity models, based, for example, on industry standards, are also recognized. Contracting parties select one or more of these maturity models based on the work product sought and specify that potential contractors responding to requests for proposals or requests for bids meet a predetermined level within the selected model or models. Consequently, potential contractors spend a significant amount of time and money attempting to determine their level within a particular model and obtain certification. In some cases, a single company may be involved in trying to certify their maturity against numerous models at the same time. Considering that each model specifies a different set of "best practices" requirements, contractors must attempt to trace their individual business practices to each set of "best practices" for each model.

SUMMARY OF THE INVENTION

Summary of the Problem

The current mechanical, i.e., human, systems and methods for tracing a company's practices to the categorical best practice requirements of numerous maturity models is time-consuming and inefficient. There is a need for a system and method that are user friendly and efficient for mapping the know-how of a company with the requirements for achieving desired levels within maturity models.

Summary of the Invention

An embodiment of the present invention describes a method for approximating the maturity of a company in view of at least one maturity model. This method includes establishing generalized work products; relating individual requirements of the at least one maturity model to the generalized work products; and providing company-specific work products. The method further includes associating the company-specific work products to the generalized work products, tracing the company-specific work products to the individual requirements of the at least one maturity model through the association of the company-specific work products to the generalized work products, and providing an indicator of the approximate maturity of the company in view of the at least one maturity model.

In a further embodiment, the maturity of the company is approximated in view of at least two maturity models.

In further embodiments, the at least one maturity model includes multiple levels of maturity, wherein the indicator of the approximate maturity is indicative of the highest of the multiple levels of maturity attained by the company. The indicator of approximate maturity may be a percentage.

In still a further embodiment, the indicator of approximate maturity is provided in a report and the report includes a list of the individual requirements of the at least one maturity model that were not traceable to at least one of the company-specific work products.

In yet another embodiment, according to the method, the generalized work products, the individual requirements of the at least one maturity model and the company-specific work products are updated on a periodic basis.

Another embodiment of the present invention describes a system for approximating the maturity of a company in view of at least one maturity model. The system includes at least one means, e.g., server(s) or the like, for storing data representative of generalized work products, data representative of individual requirements for the at least one maturity model and data representative of the company-specific work products. The system further includes at least one relationship database for relating the data representative of generalized work products to the data representative of individual requirements for the at least one maturity model; an application for prompting the association of the data representative of the company-specific work products to the data representative of generalized work products; an application for tracing the data representative of the company-specific work products to the data representative of individual requirements for the at least one maturity model; and an application for providing an indicator of the approximate maturity of the company in view of the at least one maturity model.

Further to this embodiment, the system may include a user interface. The user interface may be a computer that includes a processor, at least one data input means such as a keyboard, a network connection, and port, e.g., I/O, USB, serial, parallel, etc. and at least one data output means, e.g., screen, printer, etc.

Yet another embodiment of the present invention describes a method for using a maturity tracing system in order to determine the approximate maturity level of an organization in view of at least one maturity model. The method includes entering data indicative of organization-specific work products into the maturity tracing system through a user interface and associating the organization-specific work products with pre-existing generalized work products provided on the maturity tracing system through the user interface. Upon request, the system traces the organization-specific work products to maturity requirements for the at least one maturity model through the user interface using at least one application for relating the pre-existing generalized work products to the maturity requirements for the at least one maturity model.

The method further includes requesting a report indicating the approximate maturity level of the organization in view of at least one maturity model through the user interface.

Detailed descriptions of the summarized embodiments are described below.

BRIEF DESCRIPTION OF THE FIGURES

In the Figures:

FIGS. 4-20 are representative screen shots of an exemplary process flow according to an embodiment of the present invention.

DETAILED DESCRIPTION OF THE INVENTION

Figure 1:
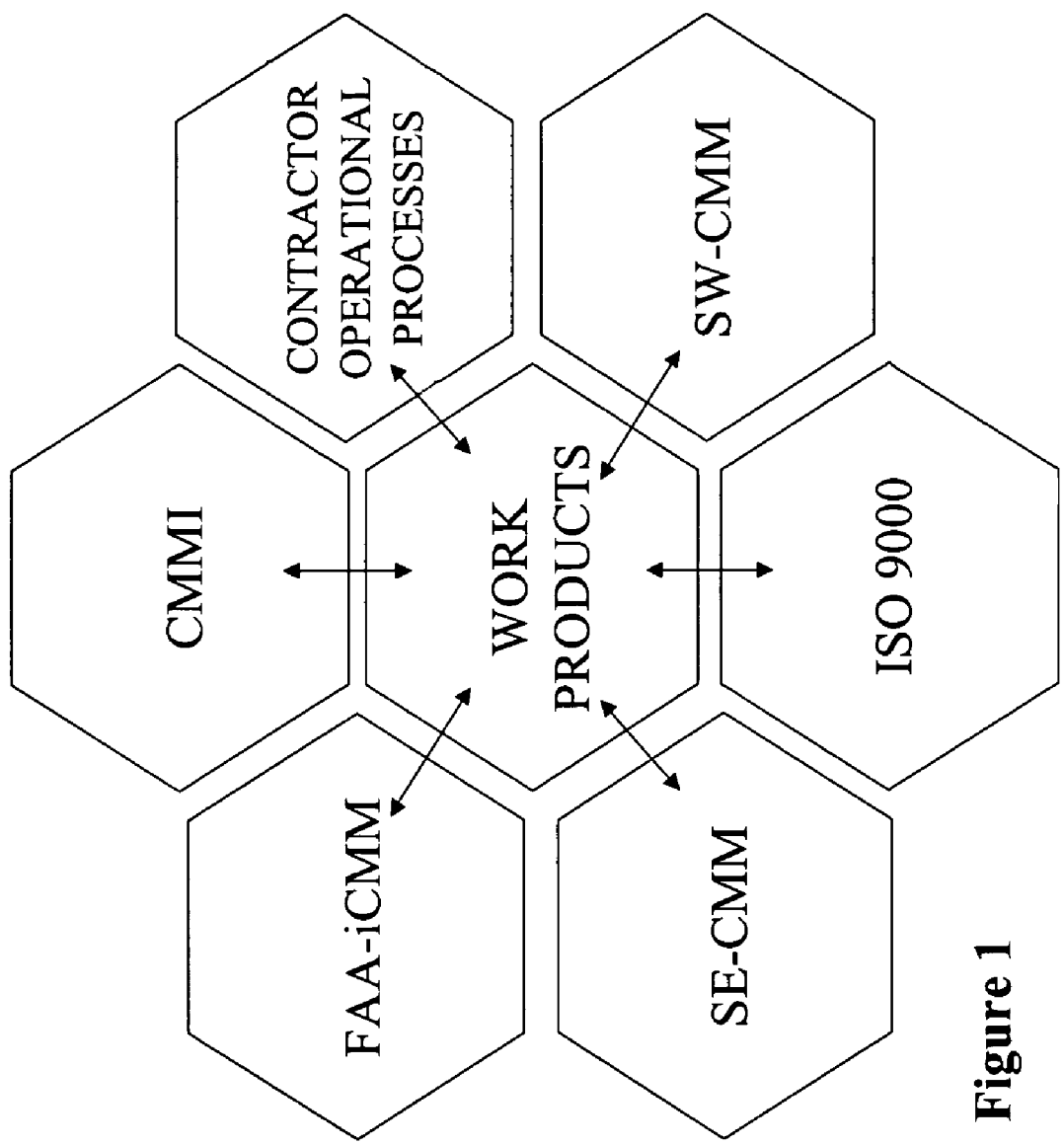
FIG. 1 is an exemplary representation of the relationships that define the systems and methods of the present invention.

The Tables set forth below are intended to define terminology and abbreviations utilized with respect to the specification and the Figures to describe the exemplary embodiment. These Tables are in no way intended to limit the scope of the invention, but rather are intended to aid the reader in understanding the exemplary embodiment. Table 1 presents abbreviations, meanings and definition comments for general abbreviations used throughout this specification. Tables 2-5 present individualized abbreviations, meanings and definition comments for a representative organization X's process and three (3) recognized maturity models SE-CMM, FAA-iCMM and CMMI. One skilled in the art understands the variations to Tables 1 through 5 that would be within the scope of the invention as well as the limitless possibilities for additional tables depending on the certification sought by the organization.

TABLE 1

| Abbreviation | Meaning | Comment |
|---|---|---|
| *General* | | |
| PK | Primary Key | The column of the table on which the data is indexed |
| FK | Foreign Key | The referenced index number from another table |
| Arrow | Relationship | One record is related to many records in the table on the point end of the arrow |
| *Tables* | | |
| Work Product Table | | Identifies all the work products associated with all models in the tool, and allows the user to associate organizational work products to those listed in the table. |
| WPID | Work Product Identifier | Numeric Identification of each work product |
| WPName | Work Product Name | The name of the work product |
| ModelTypes Table | | Identifies the model types loaded into the tool |
| ModelAbbrv | Model Abbreviation | Common Abbreviation for the models e.g. CMMI ® |
| ModelName | Model Name | Full name of the model e.g. Capability Maturity Model Integrated ® |

TABLE 2

User Organization (X's) Tables - Contain information relevant to the user-organization's processes

| | | |
|---|---|---|
| Process Type Table | | Identifies the type of process: Organizational, Project, Engineering, Support |
| PTAbbrv | Process Type Abbreviation | e.g. O for "Organization" |
| PtypTitle | Process Type Title | e.g. Organization |
| X Category Table | | Further decomposition of the process type |
| PTAbbrv | Process Type Abbreviation | e.g. O |
| XCid | Category ID | e.g. EI for "Enterprise Integration" |
| XCatTitle | Category Title | e.g. Organization Enterprise Integration |
| X Activity Table | | Identifies the process activities for each Process Category |
| PTAbbrv | Process Type Abbreviation | e.g. O |
| XCid | Category ID | e.g. EI |
| XAid | Activity ID | Numeric identifier of the Activity |
| XActivity | The title of the Activity | e.g. Establish Vision, Goals & Objectives |
| XStep Table | | Identifies the steps of the process activity |
| PTAbbrv | Process Type Abbreviation | e.g. O |
| XCid | Category ID | e.g. EI |
| XAid | Activity ID | Numeric identifier of the Activity |
| XStepid | Step ID | Numeric identifier of the step |
| XStep | Step Title | e.g. Identify stakeholders |
| XActWPJoin Table | | The relational table that joins work products in the work product table to the associated Organizational process activity |
| JoinID | Primary Key that identifies the relationship records | Unique numeric identification of the association between the work product table and the associated organizational process activity |
| XProdID | Organizational Product ID | Numeric Identifier of the Organization's Work Products |
| PTAbbrv | Process Type Abbreviation | e.g. O |
| XCid | Category ID | e.g. EI |
| XAid | Activity ID | Numeric identifier of the Activity |
| XProducts Table | | This table lists the work products produced by the organization |
| XProdID | Organizational Product ID | Numeric Identifier of the Organization's Work Products |
| XProdName | Organizational Product Name | Name of the Organization's work product |
| WPJoinXProd Table | | This table records the association between the Organization's work products and the various Models' recommended work products |
| Wjoin | Primary Key | Unique numeric identifier for each association of an organization's work product with a model's recommended work product |
| WPID | Work Product Identifier | Numeric Identification of each work product |
| XProdID | Organizational Product ID | Numeric Identifier of the Organization's Work Products |

TABLE 3

SE-CMM ® Process Model Tables

| | | |
|---|---|---|
| SEProcessAreas Table | | Identifies the Process Areas of the SE-CMM ® |
| SEPANo | SE-CMM ® Process Area Number | Numeric identification of the SE-CMM ® Process Areas |

TABLE 3-continued

SE-CMM ® Process Model Tables

| | | |
|---|---|---|
| SEPATitle | SE-CMM ® Process Area Title | Titles of the SE-CMM ® Process Areas |
| PTAbbrv | Process Type Abbreviation | e.g. O |
| SECMMBasePractices Table | | Identifies the base practices of the SE-CMM ® Model |
| SEPANo | SE-CMM ® Process Area Number | Numeric identification of the SE-CMM ® Process Areas |
| BPNo | SE-CMM ® Base Practice Number | Numeric identification of the SE-CMM ® Base Practice |
| BPTitle | SE-CMM ® Base Practice Title | Titles of the SE-CMM ® Base Practices |
| SEBPWPJoin Table | | Relational table that associates the Base Practices to the Work Products in the Work Product Table |
| JoinID | Primary Key | Unique numeric identification of the association between the Base Practice and Work Product |
| SEPANo | SE-CMM ® Process Area Number | Numeric identification of the SE-CMM ® Process Areas |
| BPNo | SE-CMM ® Base Practice Number | Numeric identification of the SE-CMM ® Base Practice |
| WPID | Work Product Identifier | Numeric Identification of each work product |
| SECMMCapabilityLevels Table | | These tables capture the SE-CMM ® model's measurement of capability assessment levels. This one identifies the 6 levels |
| SECMMCLNo | SE-CMM ® Capability Level number | Numeric: 0-5 |
| SECMMCLTitle | SE-CMM ® Capability Level Title | Title of the capability level |
| SECMMComonFeatures Table | | Identifies the common features for each capability level |
| SECMMCLNo | SE-CMM ® Capability Level number | Numeric: 0-5 |
| SECMMCFNo | SE-CMM ® Common Feature Number | Numeric identification of the common feature |
| SECMMCFTitle | SE-CMM ® Common Feature Title | Title of the common feature |
| SECMMGenericPractices Table | | Identifies the generic practices that are associated with each common feature |
| SECMMCLNo | SE-CMM ® Capability Level number | Numeric: 0-5 |
| SECMMCFNo | SE-CMM ® Common Feature Number | Numeric identification of the common feature |
| SECMMGPNo | SE-CMM ® Generic Practice Number | Numeric identification of generic practices associated with each common feature |
| SECMMGPTitle | SE-CMM ® Generic Practice Title | Title of the generic practice |
| SECMMPAJoinSECMMGP Table | | Table associates the General Practice with the Process Areas of the SE-CMM ® model |
| JoinID | Primary Key | Unique numeric identification of the association between the Practice Area and the Generic Practice |
| SEPANo | SE-CMM ® Process Area Number | Numeric identification of the SE-CMM ® Process Areas |
| SECMMCLNo | SE-CMM ® Capability Level number | Numeric: 0-5 |
| SECMMCFNo | SE-CMM ® Common Feature Number | Numeric identification of the common feature |
| SECMMGPNo | SE-CMM ® Generic Practice Number | Numeric identification of generic practices associated with each common feature |

TABLE 4

FAA iCMM ® Process Model Tables

| | | |
|---|---|---|
| iCMMProcessAreas Table | | Identifies the Process Areas of the FAA's iCMM ® Model |
| iCPANo | iCMM ® Process Area Number | Numeric identification of the iCMM ® Process Area |
| iCPATitle | iCMM ® Process Area Title | Title of the process area from the iCMM ® |
| PTAbbrv | Process Type Abbreviation | e.g. O |
| iCMMBasePractices Table | | Identifies the Base Practices of the iCMM ® |
| iCPANo | iCMM ® Process Area Number | Numeric identification of the iCMM ® Process Area |
| iCBPNo | iCMM ® Base Practice Number | Numeric identification of the iCMM ® Base Practices associated with each Process Area |
| iCBPTitle | iCMM ® Base Practice Title | Title of the base practice from the iCMM ® |
| iCBPWPJoin Table | | Table associates the iCMM ® Base Practice with Work Products |
| JoinID | Primary Key | Unique numeric identification of the association between the Base Practice and the Work Product |
| iCPANo | iCMM ® Process Area Number | Numeric identification of the iCMM ® Process Area |
| iCBPNo | iCMM ® Base Practice Number | Numeric identification of the iCMM ® Base Practices associated with each Process Area |
| WPID | Work Product Identifier | Numeric Identification of each work product |
| iCMMCapabilityLevels Table | | These tables capture the iCMM ® model's measurement of capability assessment levels. This one identifies the 6 levels |
| iCMMCLNo | iCMM ® Capability Level number | Numeric: 0-5 |
| iCmmCLTitle | iCMM ® Capability Level Title | Title of the capability level |
| iCMMGenericPractices Table | | Identifies the generic practices that are associated with each Capability Level |
| iCMMCLNo | iCMM ® Capability Level number | Numeric: 0-5 |
| iCMMGPNo | iCMM ® Generic Practice Number | Numeric identification of generic practices associated with each Capability Level |
| iCMMGPTitle | iCMM ® Generic Practice Title | Title of the generic practice |
| iCMMPAJoiniCMMGP Table | | Table associates the General Practice with the Process Areas of the iCMM ® model |
| JoinID | Primary Key | Unique numeric identification of the association between the Practice Area and the Generic Practice |
| iCMMCLNo | iCMM ® Capability Level number | Numeric: 0-5 |
| iCMMGPNo | iCMM ® Generic Practice Number | Numeric identification of generic practices associated with each Capability Level |

TABLE 4-continued

FAA iCMM ® Process Model Tables

| | | |
|---|---|---|
| iCPANo | iCMM ® Process Area Number | Numeric identification of the iCMM ® Process Area |

TABLE 5

SEI CMMI ® Process Model Tables

| | | |
|---|---|---|
| CMMIProcessAreaCategory Table | | Identifies the process area categories in the SEI's CMMI ® Process Model |
| CMMID | Primary Key | Numeric identifier of the process area category |
| Title | Title | Title of the Process Area Category |
| CMMIProcessArea Table | | Identifies the Process Areas within each Process Area Category of the CMMI ® |
| PAAbbrv | Process Area Abbreviation | Acronym identifying the process area |
| Title | Title | Process Area Title |
| CMMID | Foreign Key | Numeric identifier of the process area category |
| CmmiGoals Table | | Identifies the goals associated with each process area of the CMMI ® |
| PAAbbrv | Process Area Abbreviation | Acronym identifying the process area |
| GABB | Goal/Practice Number | Numeric identifier Stating whether the record is a goal or a practice |
| GoalNumber | Goal Number | Numeric identifier of the goal |
| GoalTitle | Goal Title | Title of the Goal |
| PracNumber | Foreign Key | Numeric identifier of the practice |
| CLNumber | Capability Number | Numeric identifier of the Capability Level |
| CMMIGoal_PracticeType Table | | Provides two records to identify whether a record is a goal or a practice in the CMMI ® Process Model |
| GABB | Goal/Practice Number | Numeric identifier Stating whether the record is a goal or a practice |
| GoalTitle | Goal Title | e.g. Goal or Practice |
| CMMICapabilityLevel Table | | Identifying Capability Levels as identified in the CMMI ® Process Model |
| CLNumber | Capability Level Number | Numeric Identifier of Capability Level e.g. 0-5 |
| Capability | Capability Title | Capability title |
| CmmiPractices | | Table identifying the Base Practices of each Process Area of the CMMI ® Process Model |
| PAAbbrv | Process Area Abbreviation | Acronym identifying the process area |
| GABB | Goal/Practice Number | Numeric identifier Stating whether the record is a goal or a practice |
| GoalNumber | Goal Number | Numeric identifier of the goal |
| PracNumber | Foreign Key | Numeric identifier of the practice |
| CLNumber | Capability Number | Numeric identifier of the Capability Level |
| Title | Title | Base Practice Title |
| CMMIWPJoin Table | | Table associates the CMMI ® Base Practice with Work Products |
| JoinID | Primary Key | Numeric identifier of the records associating Base Practices with CMMI ® Suggested Work Products |
| PAAbbrv | Process Area Abbreviation | Acronym identifying the process area |
| GABB | Goal/Practice Number | Numeric identifier Stating whether the record is a goal or a practice |

TABLE 5-continued

SEI CMMI ® Process Model Tables

| | | |
|---|---|---|
| PracNumber | Foreign Key | Numeric identifier of the practice |
| CLNumber | Capability Number | Numeric identifier of the Capability Level |
| WPID | Work Product Identifier | Numeric Identification of each work product |
| GoalNumber | Goal Number | Numeric identifier of the goal |
| CMMISubPractices Table | | Table identifying the sub practices associated with each Base Practice of the CMMI ® Process Model |
| PAAbbrv | Process Area Abbreviation | Acronym identifying the process area |
| GABB | Goal/Practice Number | Numeric identifier Stating whether the record is a goal or a practice |
| GoalNumber | Goal Number | Numeric identifier of the goal |
| PracNumber | Foreign Key | Numeric identifier of the practice |
| CLNumber | Capability Number | Numeric identifier of the Capability Level |
| SubNo | Sub Practice Number | Numerical identifier of a sub practice associated with a Base Practice |
| SubPracTitle | Sub Practice Title | Sub Practice Title |

In a first exemplary preferred embodiment of the present invention, a process for tracing a company's work products to the equivalent work product element requirements for individual maturity models is described. Referring to FIG. 1, the embodiments of the present invention facilitate the tracing of a contractor's work products to the required elements of at least one maturity model, i.e., CMM-based, or maturity model equivalent, e.g., contractor operational processes and ISO (International Standards Organization) requirements. As discussed in the background of the invention, there are numerous maturity models, both formal and informal, that are often used by contracting parties to assess and filter out potential contractors. By way of specific example and for context, many government agencies require that in order to bid on certain high dollar contracts (hereafter "High K"), e.g., for developing systems or software, that the contractor must be certified at a CMM level three (3), but the agency does not specify which CMM-based maturity model level 3 must be achieved. As referenced above in the background of the invention, there are numerous CMM-based maturity models, e.g., Capability Maturity Model Integration (CMMI), SW-CMM Capability Maturity Model for Software, P-CMM People Capability Maturity Model, SA-CMM Software Acquisition Capability Maturity Model, SE-CMM Systems Engineering Capability Maturity Model, and IPD-CMM Integrated Product Development Capability Maturity Model. Further, each of these different maturity models, though similar in many requirements, still vary with respect to certain essential elements. Thus, a potential contractor seeking to bid on a particular High K, seeks to be certified at a level 3 of at least one of the many CMM-based maturity models. Alternatively, different contractors may require varying levels certification within a specific maturity model. Additionally, contractors, who have invested in supporting one maturity model, can use the features of the system and method described herein to initially assess their potential against one or more additional specific maturity models or standards embodied in the system of the present invention.

Figure 2:
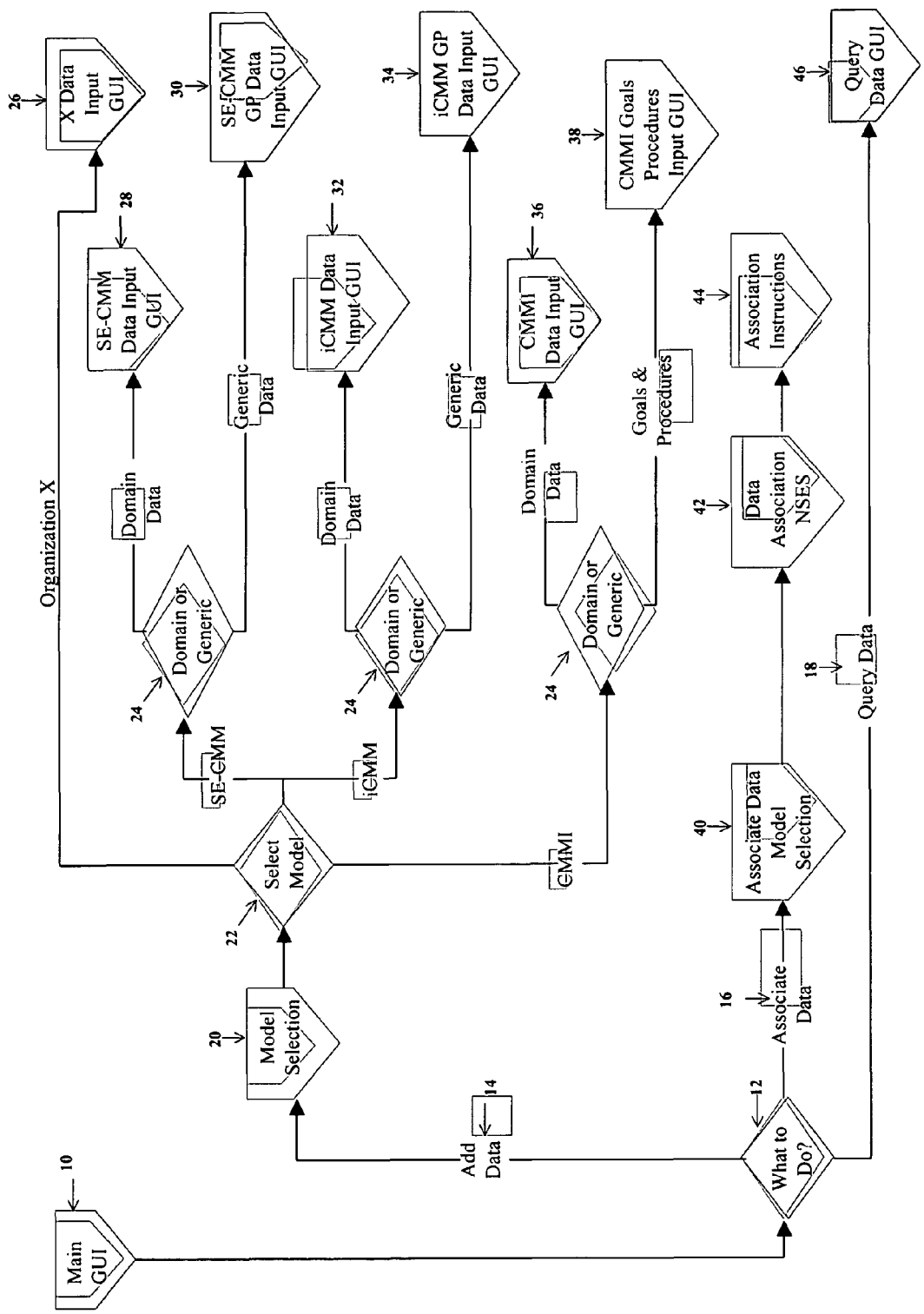
FIG. 2 is a top-level tracer database schematic according to an embodiment of the present invention.

Referring to FIG. 2, a top-level tracer database schematic for the tracing process according to an embodiment of the present invention is shown. Specifically, a user, i.e., contractor, interacts with the tracer database via a main graphical user interface (GUI) 10. The GUI is part of a user interface device, such as a computer (not shown). The user interface device comprises a processor, at least one data input means, e.g., a keyboard, a network connection, port, i.e., I/O, USB, serial, parallel, etc. and at least one data output means such as a screen and printer. These types of data input and output devices are well know to those skilled in the art and will be not be described further herein. Through the main page presented via the main GUI, a user is presented with "What to Do?" 12, choices include, adding data 14, associating data 16 and querying data 18. If a user chooses to add data, the model selection GUI 20 asks the user to "Select Model" 22. The database contains required element data for the user, i.e., the user's organization X, and one or more maturity models or the equivalent to a maturity model. In the exemplary database of FIG. 2, the user may select from SE-CMM, the iCMM, e.g., the Federal Aviation Administration's integrated CMM, and CMMI. For the SE-CMM, the iCMM and the CMMI, the user further elects between "Domain or Generic" 24 for the type of data being added. Depending on the user's selection, the appropriate GUI is presented for data entry, e.g., X's Data Input GUI 26, SE-CMM Data Input GUI 28, SE-CMM GP (Goals/Procedures) Data Input GUI 30, iCMM Data Input GUI 32, iCMM GP Data Input GUI 34, CMMI Data Input GUI 36, and CMMI GP Data Input GUI 38. Additionally, in response to "What to Do?" 12, the user may choose to associate data, i.e., between maturity model data and the user's work product data. The user selects at least one maturity model with which the user wishes to associate the user's data 40 and is presented with the data association GUI 42 for the selected model and ultimately with at least one association instructions GUI 44. Finally, in response to "What to Do?" 12, the user may query data in the database through a query data GUI 46.

Figure 3A:
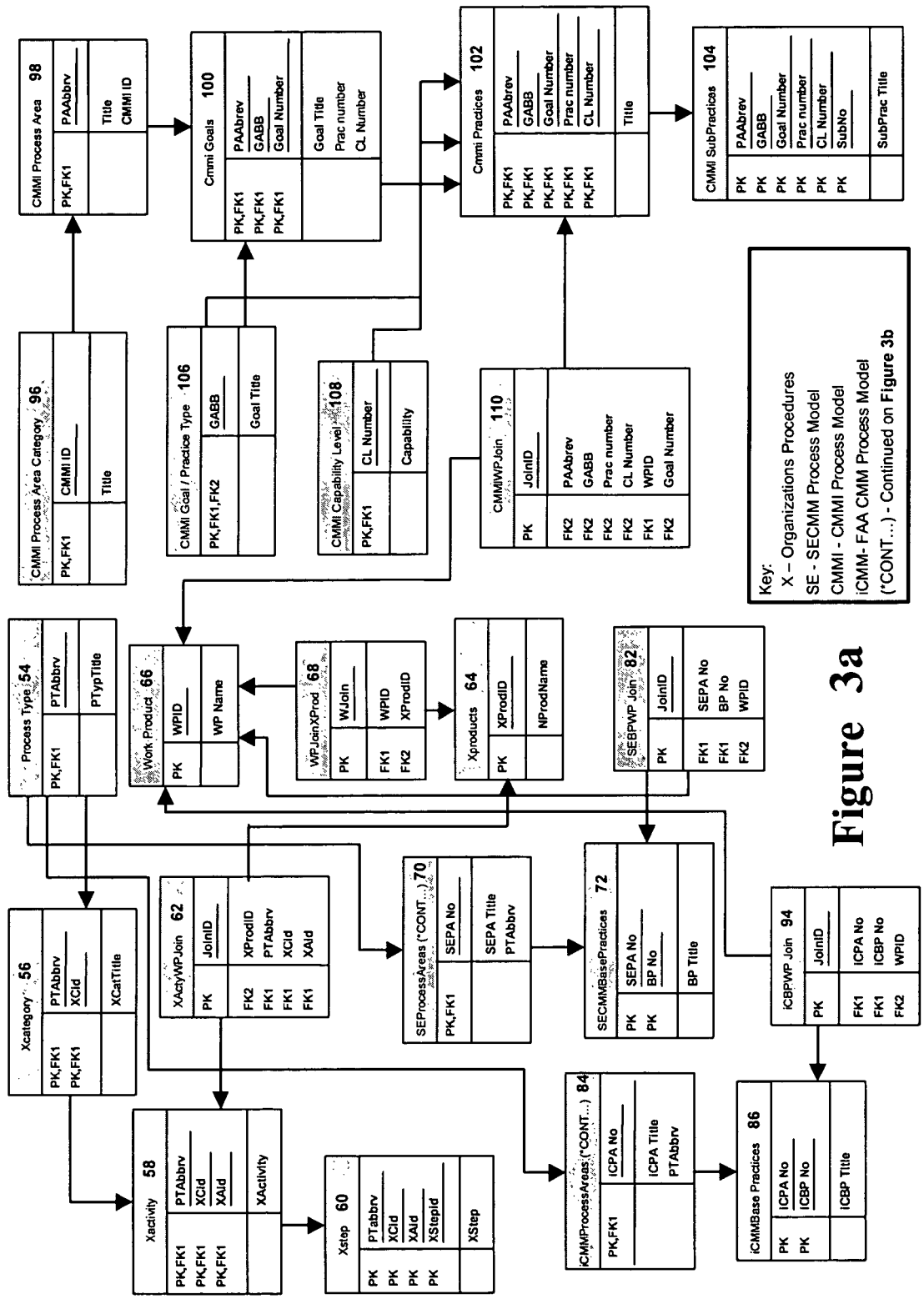
FIGS. 3(*a*)-3(*b*) show a table-based relational architecture according to an embodiment of the present invention.
Figure 3B:
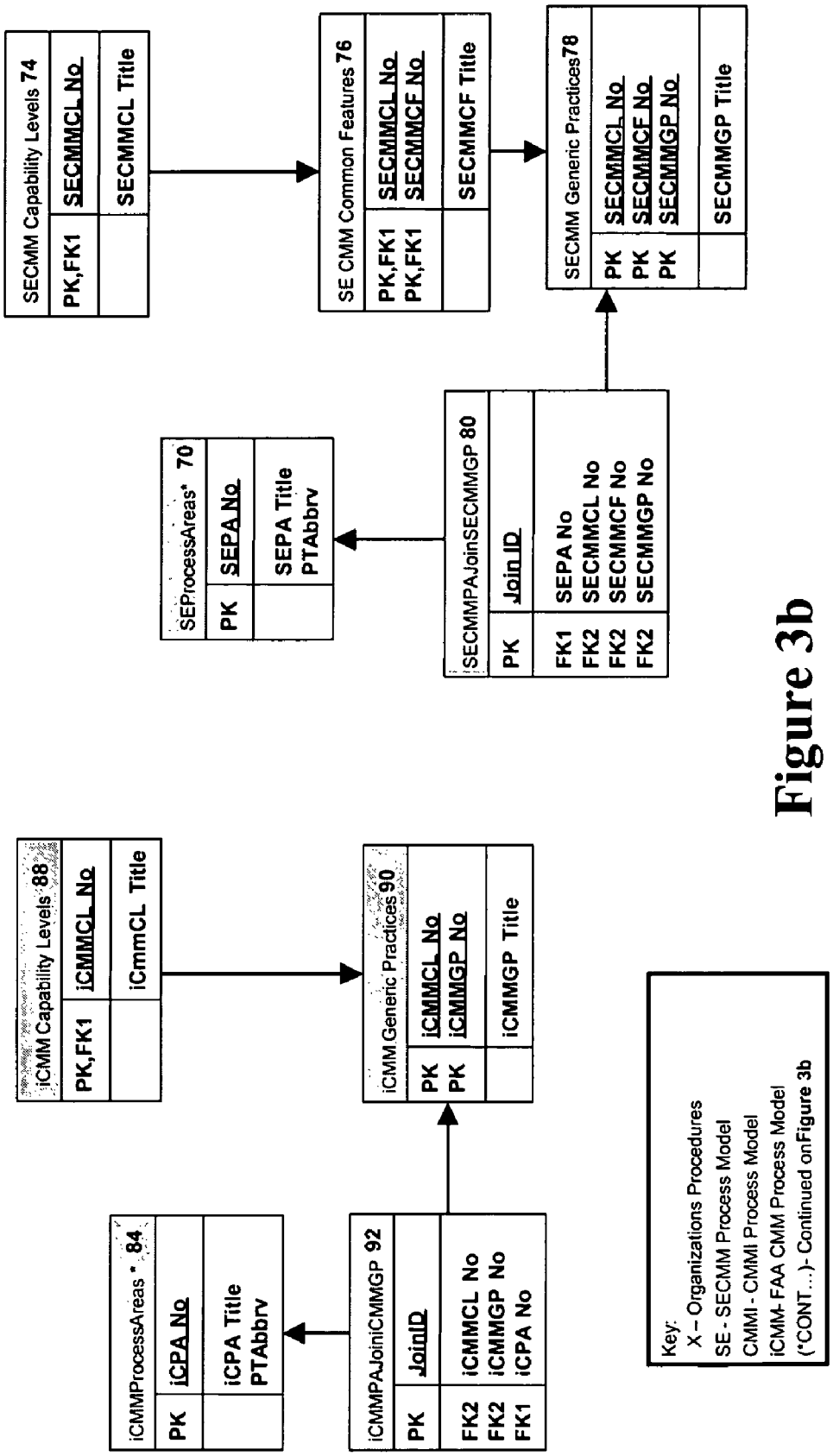

The top-level tracer database GUI schematic described above with reference to FIG. 2 is supported by a table-based relational architecture such as that described with respect to FIGS. 3(a) and 3(b). Tables 1 through 5 described above provide a description for the individual abbreviations and the terminology utilized within the related tables set forth in FIGS. 3(a) and 3(b). FIGS. 3(a) and 3(b) indicate the relationships between related tables as illustrated through the arrows. Though the architecture set forth in FIGS. 3(a) and 3(b) includes only three (3) exemplary models, i.e., SE-CMM, CMMI and iCMM, there is no limit to how few or how many models are related through the architecture. Ultimately, the tracer system described herein is capable of relating and associating all specific work products identified through the individual models with the specific work products of a user set forth in related table 68 which records the association between the user's specific work products, i.e., "Xproducts," and the recommended work products, i.e., "WP," from the various models.

Initially, a user identifies the processes, activities and work products of the user's organization X through related databases 56 to 64. Related table 54 includes the various process types identified through the architecture, e.g., organizational, project, engineering, support, etc., and related table 56 further identifies process categories with the defined process types. Similarly, related table 58 identifies process activities associated with the process categories and related table 60 identifies steps of the process activities of related table 58. Related table 62 joins X's process activities to X's work products of related table 64.

The work products of X in related table 64 are ultimately associated through the system and process of the present invention with the work products of each of the models identified within the system architecture in related table 66 through related table 68. Related table 66 is populated with the work products of each of the models. By way of specific example, according to the exemplary embodiment of the tracer system, the process recommendations of a particular model are related as follows with respect to the SE-CMM model. Incorporated herein by reference is the document which provides an overall description of the principles and architecture upon which the SE-CMM is based, "A Systems Engineering Capability Maturity Model$^{SM}$ Version 1.1." (hereafter "SE-CMM documentation). Referring to Table 2 above and FIGS. 3(a) and 3(b), related table 70 identifies and links to the particular process areas defined by the SE-CMM documentation on the domain side. Referring to the SE-CMM documentation, the numbered Process Areas ("PA") for the SE-CMM referenced through table 70 may include:

PA 01: Analyze Candidate Solutions

PA 02: Derive and Allocate Requirements

PA 03: Evolve System Architecture

PA 04: Integrate Disciplines

PA 05: Integrate System

PA 06: Understand Customer Needs and Expectations

PA 07: Verify and Validate System

PA 08: Ensure Quality

PA 09: Manage Configurations

PA 10: Manage Risk

PA 11: Monitor and Control Technical Effort

PA 12: Plan Technical Effort

PA 13: Define Organization's Systems Engineering Process

PA 14: Improve Organization's Systems Engineering Processes

PA 15: Manage Product Line Evolution

PA 16: Manage Systems Engineering Support Environment

PA 17: Provide Ongoing Skills and Knowledge

PA 18: Coordinate with Suppliers.

Additionally, for each of the Process Areas, the SE-CMM documentation describes the base practices associated therewith. Related table 72 includes the base practices associated with each of the process areas of related table 70. For example, given PA 01: Analyze Candidate Solutions, the base practices ("BP") associated therewith in related table 72 may include:

BP.01.01 Establish evaluation criteria based on the identified problem and its defined constraints;

BP.01.02 Define the general approach for the analysis, based on the established evaluation criteria;

BP.01.03 Identify alternatives for evaluation in addition to those provided with the problem statement;

BP.01.04 Analyze the competing candidate solutions against the established evaluation criteria;

BP.01.05 Select the solution that satisfies the established evaluation criteria; and BP.01.06 Capture the disposition of each alternative under consideration and the rationale for the disposition.

The SE-CMM documentation describes the BPs associated with each PA identified. Further, the BPs are further defined according to typical Work Products related to the tracing system through related table 82. For example, Table 6 lists BPs with their typical work products.

TABLE 6

| Base Practices (BPs) | Typical Work Products |
| --- | --- |
| BP.01.01 Establish evaluation criteria based on the identified problem and its defined constraints | captured evaluation criteria<br>trade-study criteria<br>defect data-related criteria |
| BP.01.02 Define the general approach for the analysis, based on the established evaluation criteria | trade-study approach<br>problem solving process |
| BP.01.03 Identify alternatives for evaluation in addition to those provided with the problem statement | trade-study alternatives<br>decision tree |
| BP.01.04 Analyze the competing candidate solutions against the established evaluation criteria | analyses of candidate solutions |
| BP.01.05 Select the solution that satisfies the established evaluation criteria | trade study<br>rationale for preferred solution<br>description of the preferred solution |
| BP.01.06 Capture the disposition of each alternative under consideration and the rationale for the disposition | evaluation of alternatives for the trade study<br>mathematical models of appropriate solutions<br>reports of prototype operation<br>results of tradeoff studies<br>other supporting data of all studies |

Similarly, the SE-CMM documentation describes a link between the PAs and the capability levels ("CL"), 0-5; defined for the SE-CMM. Related tables 74 and 76 in FIG. 3(*b*) include the CLs for the SE-CMM and the Common Features ("CF") associated with each of the CLs as shown in Table 7.

TABLE 7

| Capability Level | Common Features |
| --- | --- |
| 0 - Not Performed | None |
| 1 - Performed Informally | Base practices performed |
| 2 - Planned and Tracked | Planning performance<br>Disciplined performance<br>Verifying performance<br>Tracking performance |
| 3 - Well Defined | Defining a standard process<br>Perform the standard process |
| 4 - Quantitatively Controlled | Establishing measurable quality goals<br>Objectively managing performance |
| 5 - Continuously Improving | Improving organizational capability<br>Improving process effectiveness |

Additionally, each common feature is further detailed by one or more generic practices ("GP"). These generic practices are listed in related table 78. The relational database architecture includes related table 80 for associating the PA from related table 70 with the generic practices from related table 64. All of the information related to the PA, BP, CF, GP and ultimately CL defines the SE-CMM work products included in related table 66. The SE-CMM work products are associated with the base practices of SE-CMM from related table 72 within related table 82. Based on the associations set forth in related table 68, the system and method of the present invention provide the user with an indication of the capability level, 0-5 of the SE-CMM, at which the user's processes may be rated in view of the user's work products. This indication may be in the form of a percentage or the like.

The SE-CMM example set forth herein is repeated for each of the maturity models provided in the architecture. For the iCMM, related tables 84, 86, 88, 90, 92 and 94 populate related table 66 with the work products indicative of the iCMM and through related table 68, provide the user with an indication of the capability level, 0-5 of the iCMM, at which the user's processes may be rated in view of the user's work products. Finally, for the example set forth in FIGS. 3*a*-3*b*, related tables 96, 98, 100, 102, 104, 106, 108 and 110 populate related table 66 with the work products indicative of the CMMI and through related table 68, provide the user with an indication of the capability level, 0-5 of the CMMI, at which the user's processes may be rated in view of the user's work products. At the time of drafting the present application, versions 1.0 and 2.0 of the FAA-iCMM documentation, which integrated various models in a single model, were accessible on the FAA website Versions 1.0 and 2.0 of the FAA-iCMM documentation are hereby incorporated by reference in their entirety. Similarly, at the time of filing, versions of the documentation for various CMMI models were accessible on the FAA website. This documentation is incorporated herein by reference in its entirety. The information contained in the related databases is entered and edited on an as needed basis through a process flows such as that described with respect to FIGS. 4-20.

Figure 4:
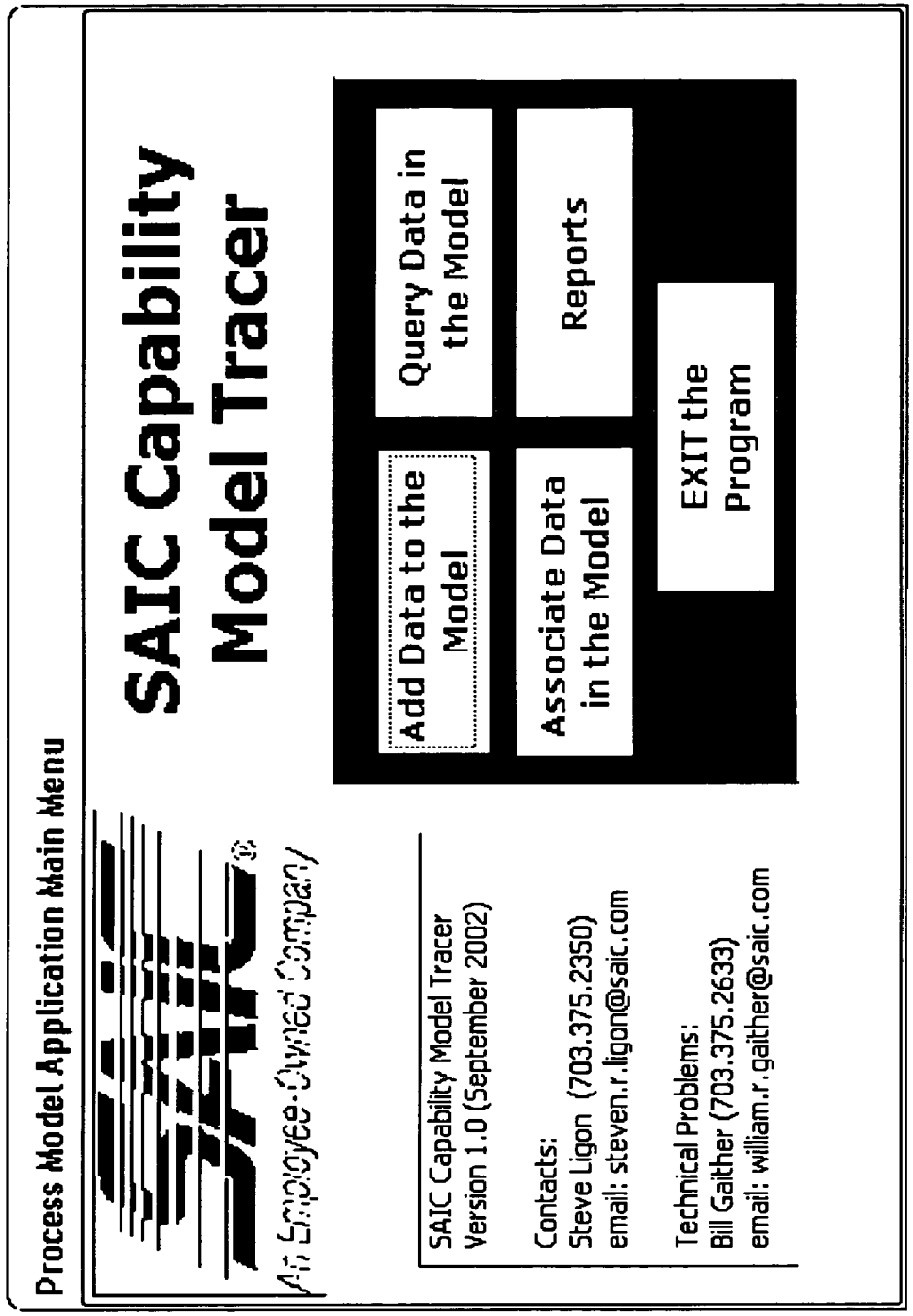
Figure 5:
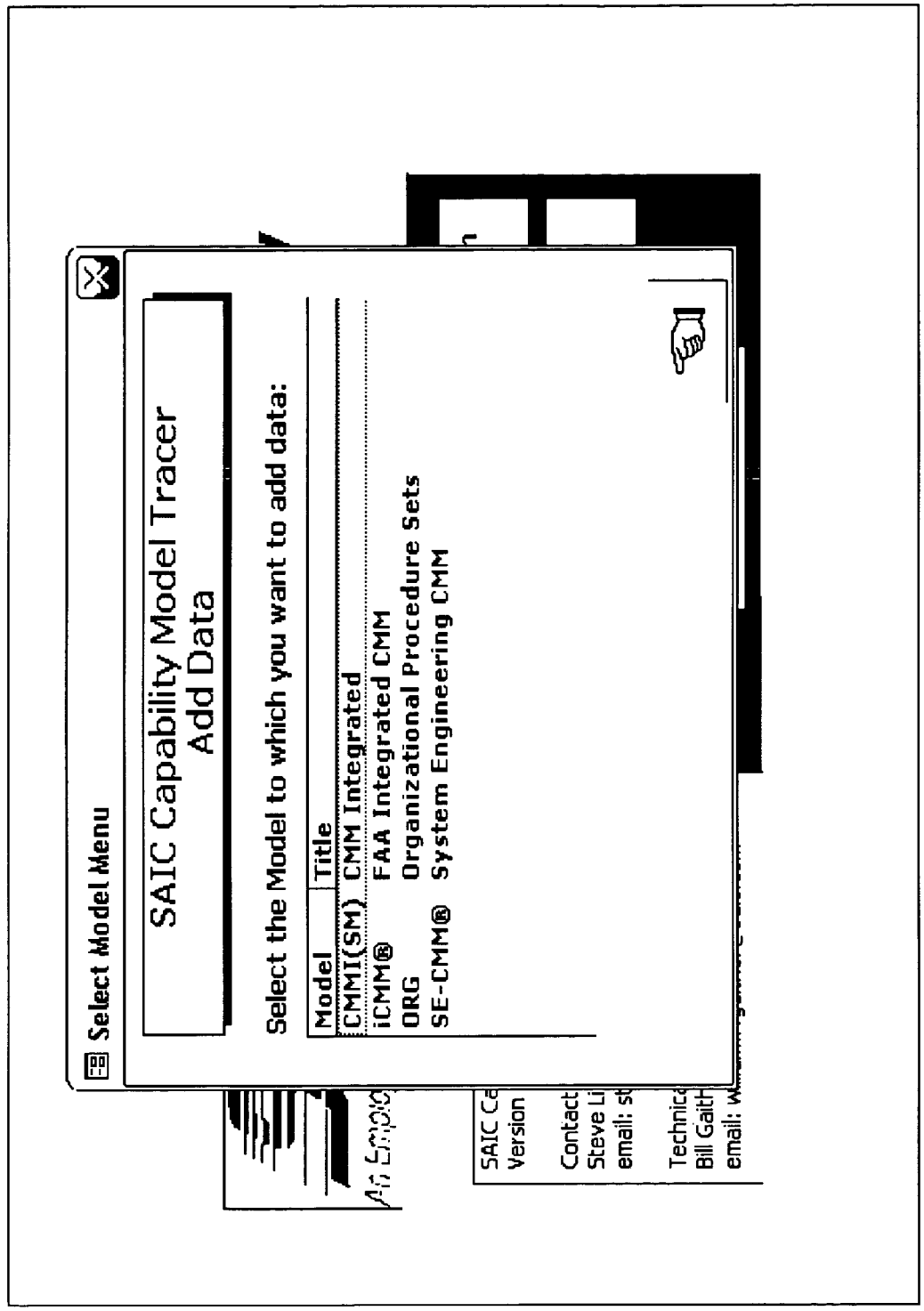

Referring to FIGS. 4-20, representative screen shots and an exemplary process flow are shown in order to illustrate exemplary user interfaces for data entry and information retrieval according to embodiments of the present invention. Referring to FIG. 4, a user is presented with a screen for selecting what actions the user wishes to take, i.e., "What to Do?" as described with respect to FIG. 2. Exemplary choices include "Add Data to the Model," "Query Data in the Model," "Associate Data in the Model," "Reports," and "EXIT the Program." As described above, there is no limitation on the number or type of Models that may be included in the system. FIG. 5 represents an exemplary screen that is presented to the user when the user selects the "Add Data to the Model" choice from the initial screen. Further to FIG. 5 the user is presented with the available models to which they may choose to add data, e.g., CMMI, iCMM, SE-CMM and ORG. In this representative process flow, when the user selects the CMMI model, the screen shown in FIG. 6 allows the user to add/edit CMMI data. As described above with reference to FIG. 3*a*, particularly related tables 96-110, the CMMI model is guided by Process Area Categories, Process Areas, Goals, Practices and SubPractices, which ultimately correlate to capability levels 0-5. The particulars of this model and variations thereto may be found in the CMMI documentation that is incorporated herein by reference. FIG. 6 illustrates an exemplary format for allowing users to update the model information.

Additionally, FIG. 6 presents the user with additional specific choices, such as, "Add/Edit SubPractices," "Add/Edit Process Area," and "Add/Edit Process Area Categories." Referring to FIG. 7, should the user choose to "Add/Edit SubPractices," the screen shown further breaks down the descriptive information, allowing the user to add/edit the requirements at the models most basic level, i.e., at the subpractice level. Should the user elect to "Add/Edit Process Area" within the CMMI model, the user may see a screen such as that shown in FIG. 8, wherein the current process areas are available for review. Finally, FIG. 9 facilitates the review of process area categories when the user selects "Add/Edit Process Area Categories" from the choices in FIG. 6.

Referring to FIG. 5, the user may alternatively or additionally, choose to add data to the iCMM model. As set forth through at least related tables 84-94 shown in FIGS. 3a and 3b, the iCMM model is guided by Process Type, Process Areas, Base Practices and Generic Practices, which ultimately correlate to capability levels 0-5. The particulars of this model and variations thereto may be found in the iCMM documentation that is incorporated herein by reference. Referring to FIG. 10, upon selecting the iCMM model, the user is presented with a screen for reviewing and adding/editing iCMM domain practices according to Process Type, Process Area and Base Practices. Additionally, from the screen illustrated through FIG. 10, the user may choose to add/edit data for the iCMM Generic Practices according to capability level as shown in FIG. 11.

Figure 12:
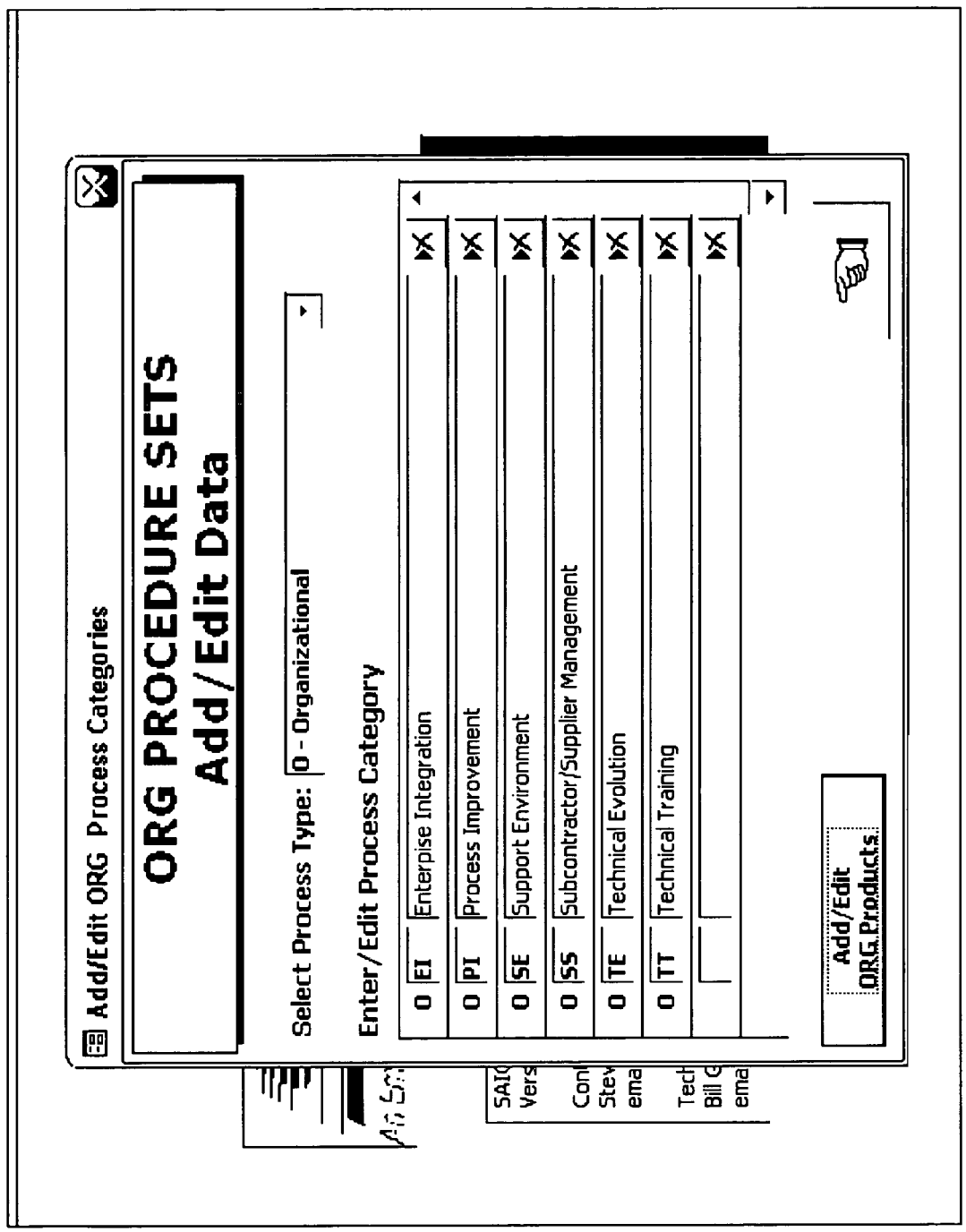
Figure 13:
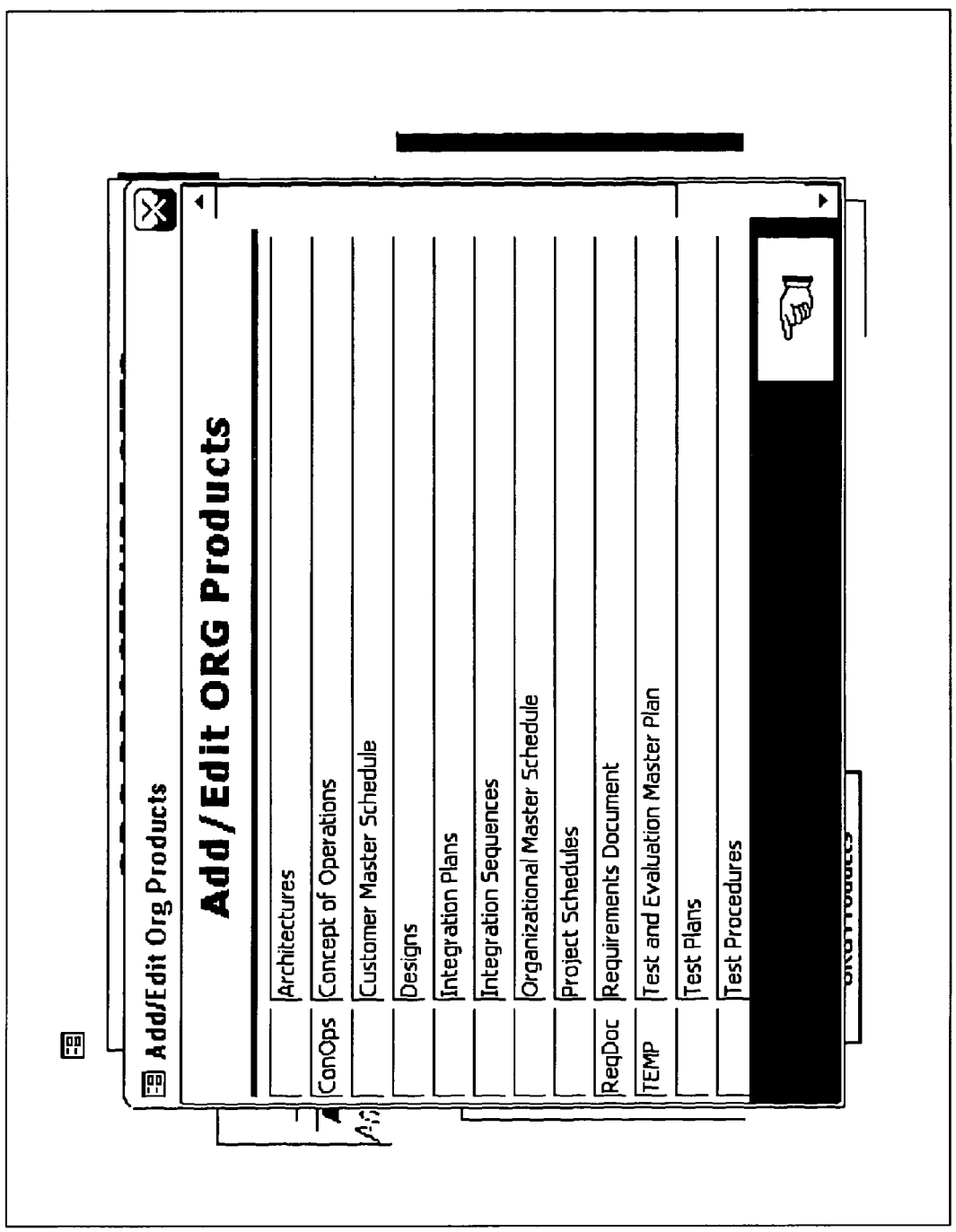

FIGS. 12 and 13 illustrate exemplary screen shots for prompting a user to add/edit data for the user's organization. In these exemplary screen shots, the user reviews/adds/edits Process Type, Process Category, and Organizational Product data. This data is linked to the other tables in the tracing system through, for example, related tables 54-64 shown in FIG. 3a. As one skilled in the art can appreciate, this data may vary widely from organization to organization and may include more detailed levels of data depending on the organization. These variations are intended to be included within the scope embodiments set forth herein.

Figure 15:
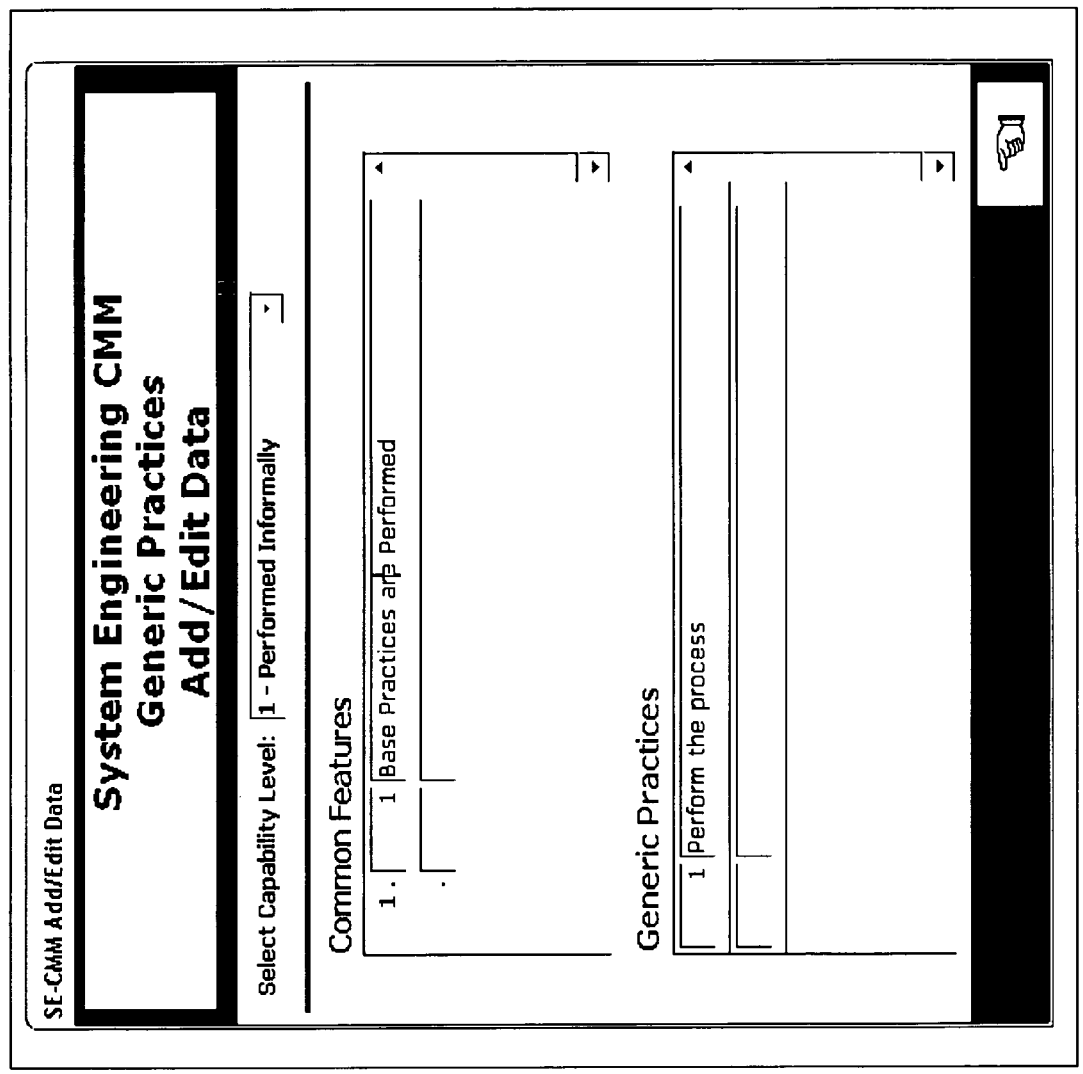

Finally, FIGS. 14 through 16 set forth exemplary screens for the review of SE-CMM model data. As described in the exemplary embodiment set forth above and referenced in related tables 70-82 shown in FIGS. 3a and 3b, the SE-CMM model is guided by Domain Practices, Process Area, Base Practices, Work Products, Common Features, and Generic Practices, which ultimately correlate to capability levels 0-5. The screen shown in FIG. 14, accessible from selecting SE-CMM through the screen shown in FIG. 5, allows a user to review and add/edit to the Process Area and Base Practices data for the SE-CMM model and to access the Generic Practices data. Through selection of Generic Practices, the user can review and add/edit Common Practices and Generic Practices data via the screen shown in FIG. 15. Additionally, the user may review and add/edit the Work Products associated with the Base Practices through the screen shown in FIG. 16.

Figure 17:
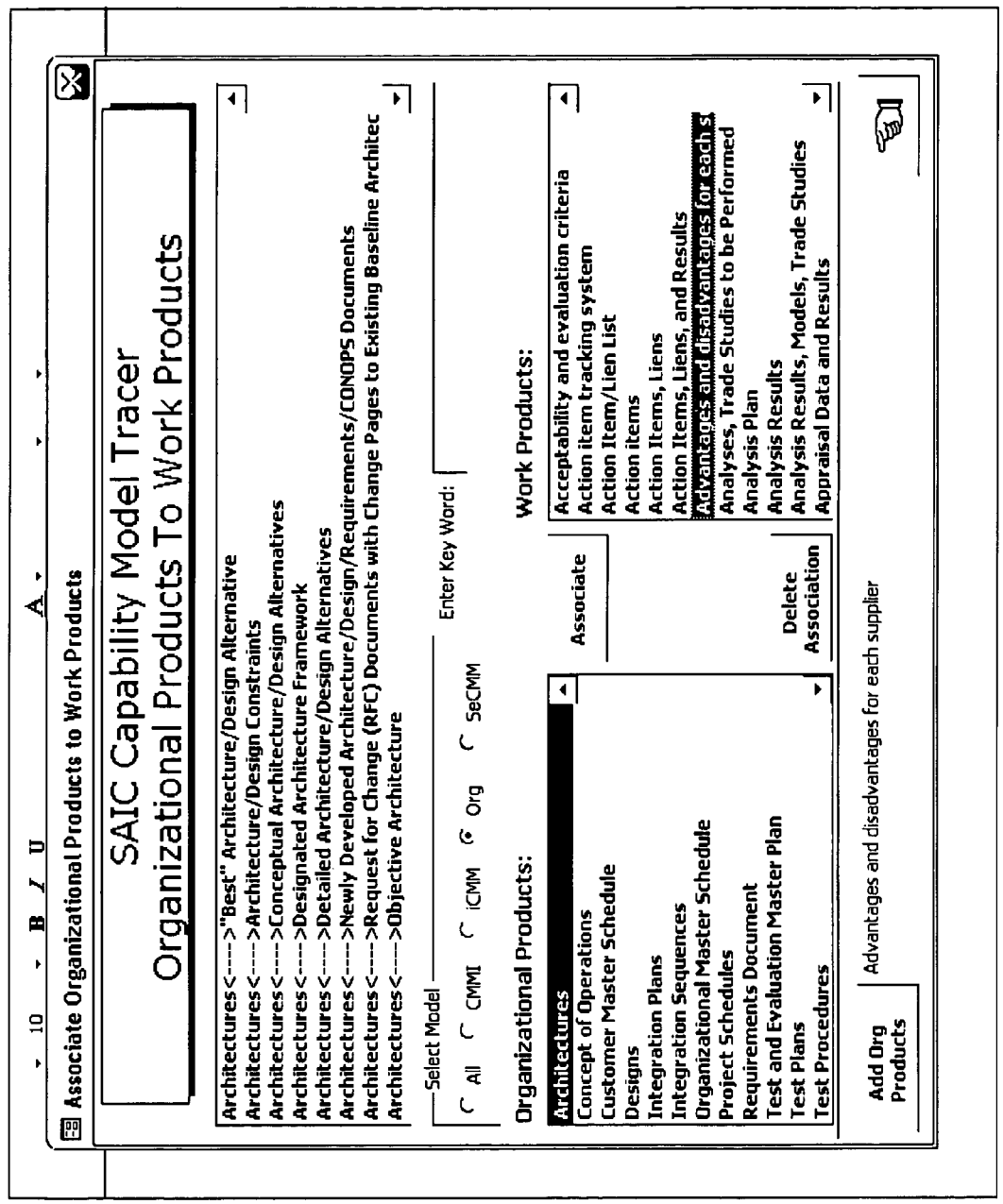

Referring again to the main screen shown in FIG. 4, the user may choose to associate the products of the user's organization, i.e., manipulated through the screens shown in FIGS. 12 and 13, with the work products identified through the related databases of FIGS. 3a and 3b for the various models included in the tracing system through the screen shown in FIG. 17. Similarly, the user may choose to disassociate previous associations when the user determines that the association is in error. As shown in FIG. 17, the user may view and associate the user's organization's products with ALL model work products or on a model-by-model basis. Further, the system allows the user, through the screen shown in FIG. 18, to trace individual organizational products to the generalized work products that are in turn traceable to criteria established for each model, i.e., SE-CMM Base Practices, CMMI Practices and iCMM Base Practices. By tracing the organization's products to the model criteria, the tracing system offers organizations an indication as to capability level achieved by the organization. Alternatively, instead of capability level, the tracing system offers an indication as to the standards reached for a particular standards model, e.g., ISO 9000. Further, the tracing system is able to give an indication as to organizational achievement within any model whose requirements are mapped to work products that can in turn be associated with the organization's products. Further still, once the organization's work products are associated with the general work products, the organization need not repeat the steps of entering and associating the organization's work products to the general work products in order to determine maturity level for a different model or standard, i.e., new or additional. The organization need only add and associate new or previously not entered organizational work products on a going-forward basis. New or additional model or standard maturity criteria is added through, for example, a software update, e.g., module, network download, or the like and the system's tracing function first traces the new model or standard maturity criteria to the general work products and second traces the organization's work products automatically to the maturity criteria for the new model or standard.

Figure 19:
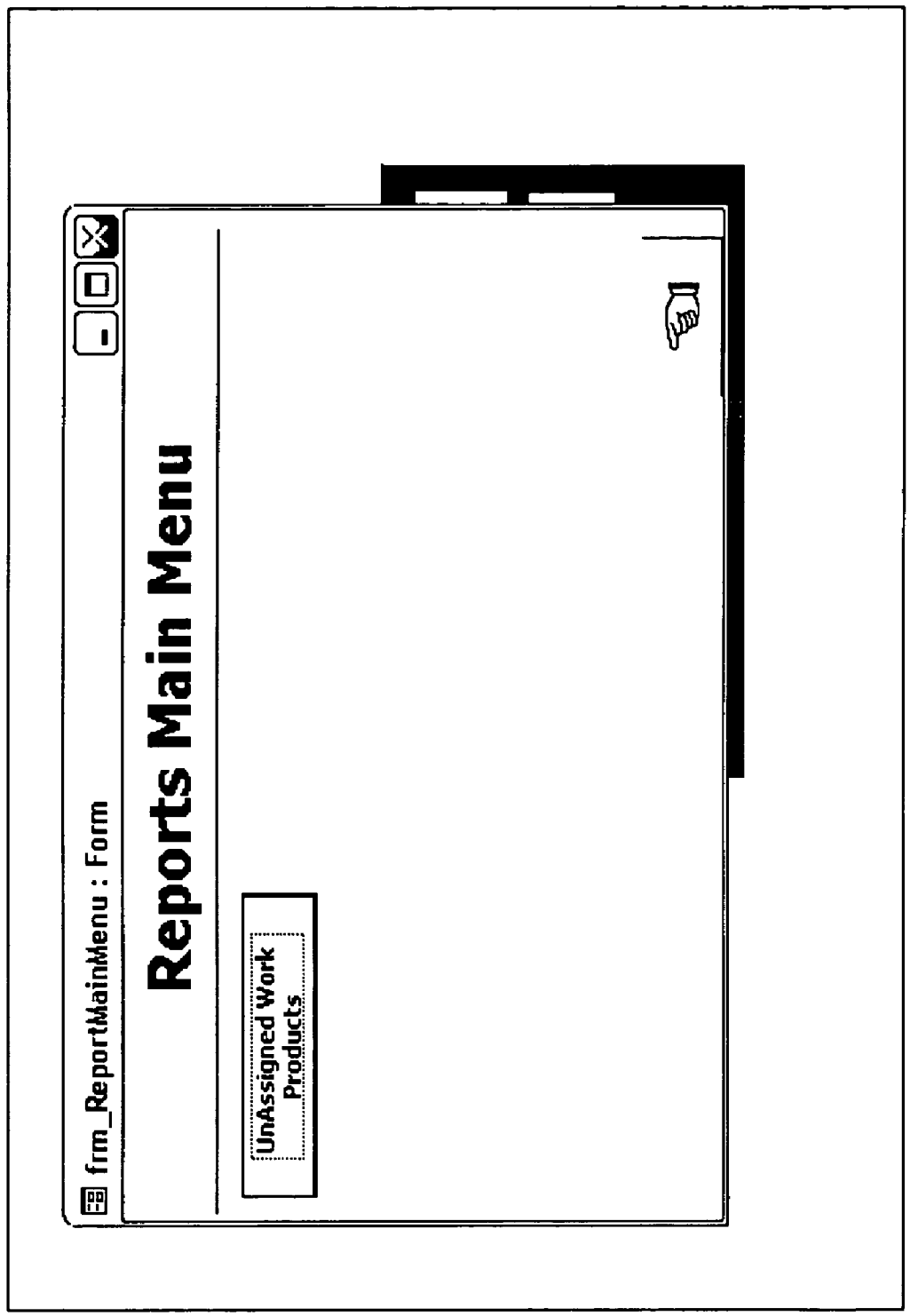
Figure 20:
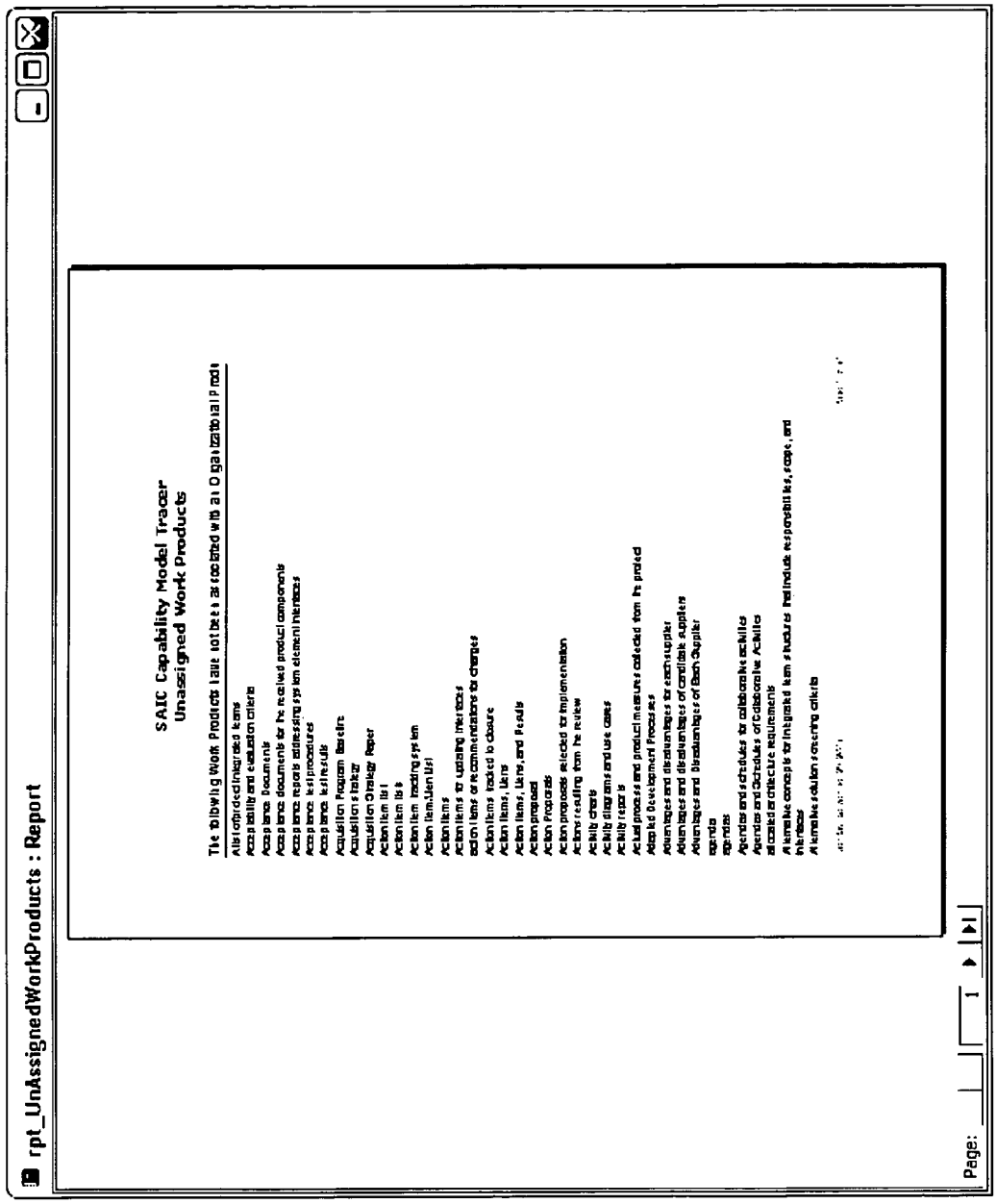

Finally, through the main screen of FIG. 4, the user is also able to select "Reports" which results in the screen shown in FIG. 19. The "Unassigned Work Product" report accessible through FIG. 19 and shown on the screen of FIG. 20, shows a user which of the work products encompassing the model requirements, have not yet been linked to an organization product. In essence, this list sets forth a to-do list for the organization. Presumably, if each of the work products can be associated to one or more of the organization's products, then the organization will have satisfied qualifications for the highest indicated capability level for each model within the tracing system. Additional reports may include other indicators of the company's maturity based on the tracing of the organization's work products to the model requirements. This indicator may be in the form of a percentage completed or the like for a specific level within the model.

In a further embodiment of the present invention, throughout the exemplary process described with respect to FIGS. 4-20, the user can gain additional information about the various practices, features, work products and the like for the models and the general practice areas by either passing the arrow over the words on the screen and/or by clicking on the words on the screen. In the former case, a pop-up window can be seen that elaborates on the selection, offering a more detailed definition and even examples of work products that would be traced to the practice or feature requirement. This same or additional information may also be accessed by clicking on the text of interest, wherein the user is linked through the network to the information, such as to a website containing a description of the particular model.

Utilizing the system and method of the present invention, the user is able to evaluate the organizations level of maturity with respect to various models in a timely and efficient manner, with high fidelity.

One skilled in the art understands the various hardware and software configurations that may be used to implement the databases and applications described herein. By way of example, the application can be run on any standard personal computer configured, at a minimum, with a Pentium III 266 megahertz CPU and 64 megabits of RAM, running Windows 98 or above and Internet Explorer 5.50 or above. Further, one skilled in the art recognizes that the embodiments set forth herein are intended to be exemplary. It is recognized that there are numerous modifications and variations to the exemplary embodiments that fall within the scope of the invention.

The invention claimed is:

1. A computer-implemented method for determining the maturity level of a company in view of multiple maturity models to meet process certification requirements comprising:

with a computer processor:
providing individual requirements of the multiple maturity models in accordance with process certification requirements on a display;
receiving generalized work products through a user interface and storing the generalized work products in a first table;
with a computer processor, relating the individual requirements of the multiple maturity models stored in at least a second table to the generalized work products stored in the first table;
receiving company-specific work products through a user interface and storing the company-specific work products in a third table;
with a computer processor, associating at least some of the company-specific work products stored in the third table with at least some of the generalized work products stored in the first table;
with a computer processor, tracing the company-specific work products stored in the third table to the individual requirements of the multiple maturity models stored in at least the second table through the association of the at least some company-specific work products stored in the third table with at least some of the generalized work products stored in the first table;
with a computer processor, generating an association user interface that lists the company-specific work products adjacent to the generalized work products of the multiple maturity models and that shows associations between the generalized work products of the multiple maturity models and the company-specific work products on a display;
with a computer processor, receiving input through the association user interface comprising one of: creating an association between listed company-specific work products and adjacent generalized work products of the multiple maturity models; and removing an association between listed company-specific work products and generalized work products of the multiple maturity models;
providing an indicator of the maturity level of the company in view of each the multiple maturity models, wherein the maturity level indicates whether the organization is certified at that maturity level.

2. The method according to claim 1, wherein the at least one maturity model includes multiple levels of maturity.

3. The method according to claim 2, wherein the indicator of maturity is indicative of the highest of the multiple levels of maturity attained by the company.

4. The method according to claim 3, wherein the indicator of maturity is a percentage.

5. The method according to claim 1, wherein the indicator of maturity is provided in a report and the report includes a list of the individual requirements of the multiple maturity models that were not traceable to at least one of the company-specific work products.

6. The method according to claim 5, wherein report further includes a list of company-specific work products that were not associated with the generalized work products.

7. The method according to claim 5, wherein the indicator of maturity is a percentage.

8. A computer-implemented method to determine the maturity level of an organization in view of multiple maturity models to meet process certification requirements comprising:

with a computer processor:
receiving data indicative of organization-specific work products into a maturity tracing system through a first user interface and storing the organization-specific work products in a first table;
with a computer processor, associating at least some of the organization-specific work products stored in the first table with at least some pre-existing generalized work products received with the maturity tracing system through a second user interface and stored in a second table;
receiving a request through a third user interface for tracing of the organization-specific work products stored in the first table to maturity requirements for the multiple maturity models stored in at least a third table, wherein the maturity tracing system includes at least one computer application for relating the pre-existing generalized work products stored in the second table to the maturity requirements for the multiple maturity models stored in at least the third table;
listing the organization-specific work products adjacent to the pre-existing generalized work products of the at least one maturity model with a fourth user interface that shows associations between the pre-existing generalized work products of the multiple maturity models and the organization-specific work products on a display;
with a computer processor, receiving input through the fourth user interface comprising one of: creating an association between listed organization-specific work products and pre-existing generalized work products of the multiple maturity models; and removing an association between listed organization-specific work products and pre-existing generalized work products of the multiple maturity models;
receiving a request for a report indicating the maturity level of the organization in view of each of the multiple maturity models through a fifth user interface, wherein the maturity level indicates whether the organization is certified at that maturity level based on process certification requirements; and
displaying the report on a display.

9. The method according to claim 8, further comprising: querying text indicative of at least one of the pre-existing generalized work products and the maturity requirements for the multiple maturity models in order to ascertain description information therefore.

10. The method according to claim 9, wherein the description information is provided in a pop-up window.

11. The method according to claim 9, wherein the description information is provided through a hyperlink.

12. The method according to claim 9, further comprising listing in a fifth user interface organization-specific work products which do not match one of pre-existing generalized work products and maturity requirements for the multiple maturity models.

13. A computer system for determining the maturity level of a company in view of multiple maturity models to meet process certification requirements comprising:

computer system architecture in communication with at least one relational database coupled to a graphical user interface (GUI), wherein the computer system includes a processor and a memory, the processor and memory configured to:

store data representative of generalized work products in a first table, data representative of individual requirements for the multiple maturity models in accordance with process certification requirements in at least a second table, and data representative of the company-specific work products in a third table;

the least one relational database for relating the data representative of generalized work products stored in the first table to the data representative of individual requirements for the multiple maturity models stored in at least the second table;

prompt in a first user interface the association of the data representative of the company-specific work products stored in the third table to the data representative of generalized work products stored in the first table;

trace the data representative of the company-specific work products stored in the third table to the data representative of individual requirements for the multiple maturity models stored in at least the second table;

list in a second user interface the company-specific work products adjacent to the generalized work products of the multiple maturity models, the second user interface showing associations between the generalized work products of the multiple maturity models and the company-specific work products on a display;

receive input through the second user interface, the input through the second user interface comprising one of: creating an association between listed company-specific work products and generalized work products of the multiple maturity models; and deleting an association between listed company-specific work products and generalized work products of the multiple maturity models; and provide and display an indicator of the maturity level of the company in view of each of the multiple maturity models, wherein the maturity level indicates whether the organization is certified at that maturity level based on process certification requirements.

14. The system according to claim 13, further comprising a user interface for collecting the data, wherein the user interface comprises data input means and data viewing means.

15. The system according to claim 14, wherein the data input means includes at least one of a keyboard, a network connection, and a port.

16. The system according to claim 13, further comprising a computer application for listing in a third user interface company-specific work products which do not match one of pre-existing generalized work products and maturity requirements for the multiple maturity models.

17. The system of claim 13, wherein the second user interface displays a listing of a plurality of maturity models, the computer application of the second user interface further receiving input comprising a selection of one of the plurality of maturity models.

* * * * *